US005566962A

United States Patent [19]
Burnham

[11] Patent Number: 5,566,962
[45] Date of Patent: Oct. 22, 1996

[54] TRUCK STEP GUARD

[76] Inventor: Roy Burnham, 6109 Old Rt. 39 N.W., Apt. 1, Dover, Ohio 44622

[21] Appl. No.: 324,398

[22] Filed: Oct. 14, 1994

[51] Int. Cl.$^6$ .................................... B60R 3/00
[52] U.S. Cl. ...................... 280/163; 182/90; 182/127
[58] Field of Search ................... 49/87.1; 182/90, 182/127; 180/69.21, 69.24; 280/163, 166

[56] References Cited

U.S. PATENT DOCUMENTS

| | | | |
|---|---|---|---|
| 1,378,713 | 5/1921 | Nami | 182/90 X |
| 1,515,979 | 11/1924 | Tubbs | 49/87.1 X |
| 1,544,326 | 6/1925 | Lelansky | 49/87.1 |
| 1,682,716 | 8/1928 | Winans | 49/87.1 X |
| 1,840,026 | 1/1932 | Ernst | 49/87.1 |
| 2,184,086 | 12/1939 | Saunders | 180/69.21 X |
| 3,171,671 | 3/1965 | Cornett | 280/163 |
| 3,488,066 | 1/1970 | Hansen | 280/163 |
| 3,623,764 | 11/1971 | Jacobus | 182/90 X |
| 4,121,691 | 10/1978 | Poplawski | 182/90 |

Primary Examiner—Kevin Hurley
Assistant Examiner—Michael Mar
Attorney, Agent, or Firm—Rader, Fishman & Grauer PLLC

[57] ABSTRACT

A device for preventing unauthorized access to the steps of vehicles. The invention includes a hinged door which covers the access steps. The door can be locked from within or without the vehicle cab. When unlocked, the door pivots, thereby allowing a foot hold to be established.

5 Claims, 4 Drawing Sheets

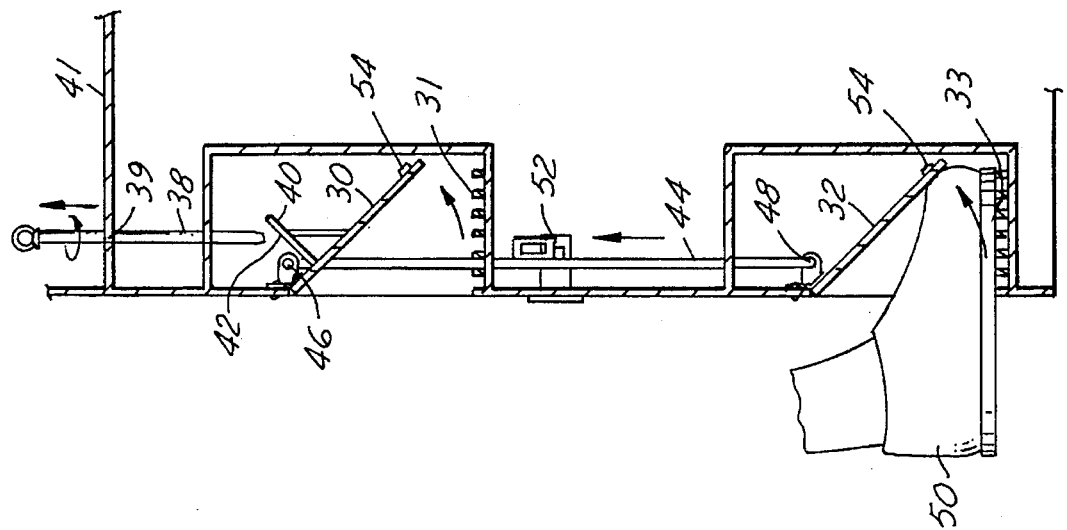
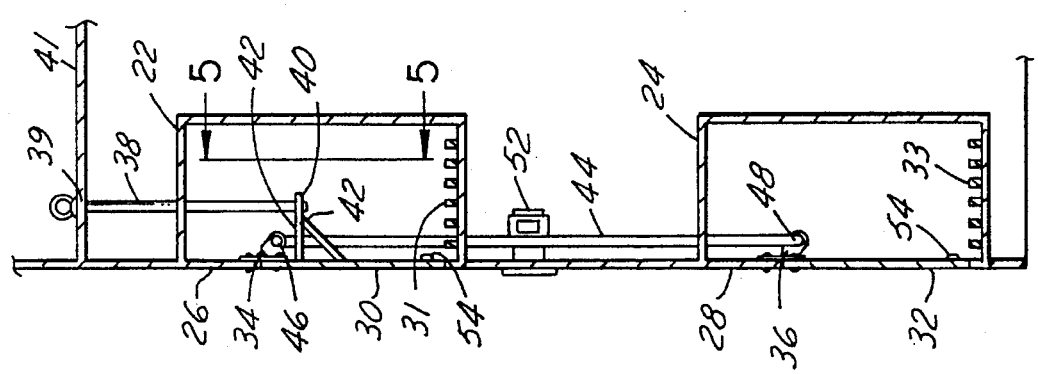
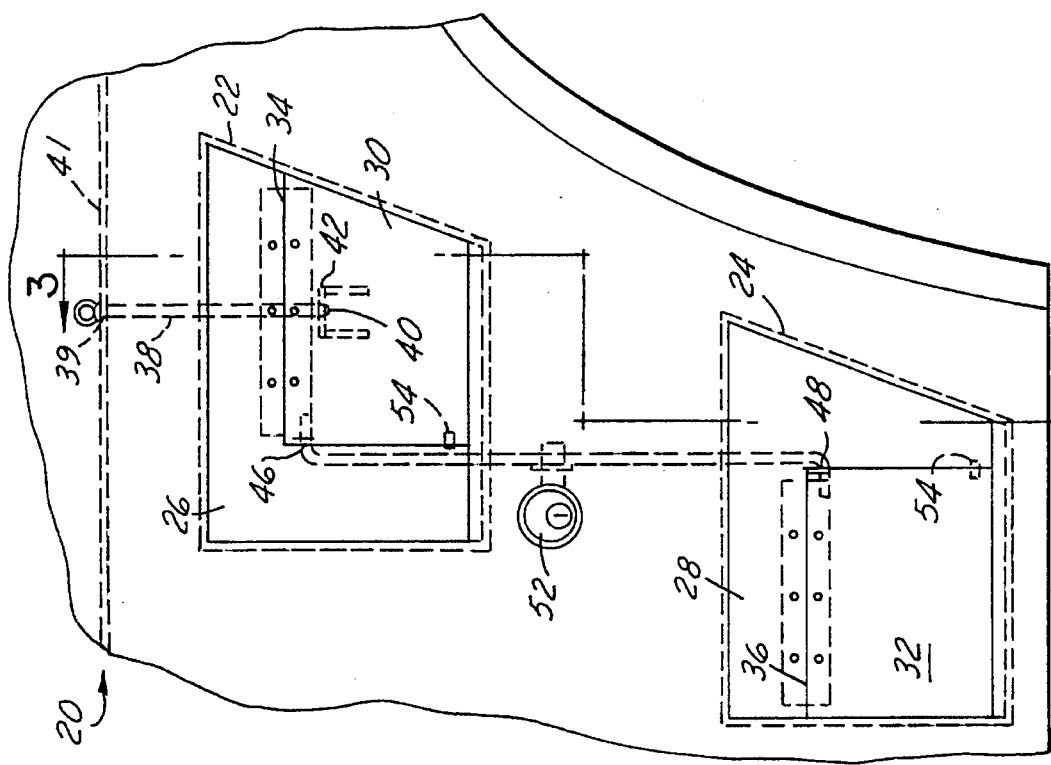

5,566,962

TRUCK STEP GUARD

FIELD OF THE INVENTION

This invention relates generally to security devices for preventing unauthorized access to the steps on a semi-truck cab or other large vehicle. In particular, this invention relates to locking doors which prevent unauthorized access to vehicle steps.

BACKGROUND OF THE INVENTION

Many large vehicles, such as semi-trucks, provide access to the driver's and passenger's doors using steps or running boards located on the side of the vehicle. These steps, however, can also be accessed by persons other than the driver or authorized passengers of the vehicle. For example, it is not uncommon for truck drivers, while waiting at a stoplight, to be harassed by vandals. The vandals typically use the cab steps to access the cab door and physically assault the driver. In some cases, the vandals use the steps to access and break windows, side view mirrors, windshield wipers, or otherwise damage the cab. Also, with current designs, the steps are available for use by unauthorized persons when the vehicle is unattended.

Accordingly, there is a need for preventing unauthorized use of the steps on a truck or other large vehicle while still permitting authorized use.

A "composite Inspection Plate-Step," as disclosed in U.S. Pat. No. 4,121,691, teaches a means for providing built in steps on a vertical surface of a vehicle side panel but does not suggest a device that restricts access or covers the steps.

A "Step For Vehicle," as disclosed in U.S. Pat. No. 3,171,671, teaches a self-concealing step for accessing a truck bed but does not teach a locking means by which access can be controlled.

It is an object of this invention to provide a security device for preventing unauthorized access to the vehicle steps of a semi-truck or other large vehicle.

It is also an object of this invention to provide drivers with the ability to prohibit unauthorized use of the steps typically associated with the cab portion of a semi-truck or other large vehicle.

It is an additional object of this invention to provide a door over the steps of a semi-truck or other large vehicle which can be locked by the driver while inside the vehicle.

It is a further object of the invention to provide a door over the steps of a semi-truck or other large vehicle which can be locked by the authorized user of the vehicle while outside the vehicle to prevent unauthorized access to the steps.

It is a further object of this invention to provide an easy to use, inexpensive, theft and vandalism deterrent device which is economical to manufacture and maintain, and extremely durable and easy to use.

BRIEF DESCRIPTION OF THE DRAWINGS

FIG. 2 is a partial side view of the semi-cab of FIG. 1 showing cubby-hole steps employing the present invention.

FIG. 3 is a cross-sectional view taken substantially along lines 3—3 of FIG. 2 showing the steps in a locked position.

FIG. 4 is a cross-sectional view taken substantially along lines 3—3 of FIG. 2 showing the steps in an unlocked and open position.

DETAILED DESCRIPTION OF THE PREFERRED EMBODIMENTS

Figure 1:
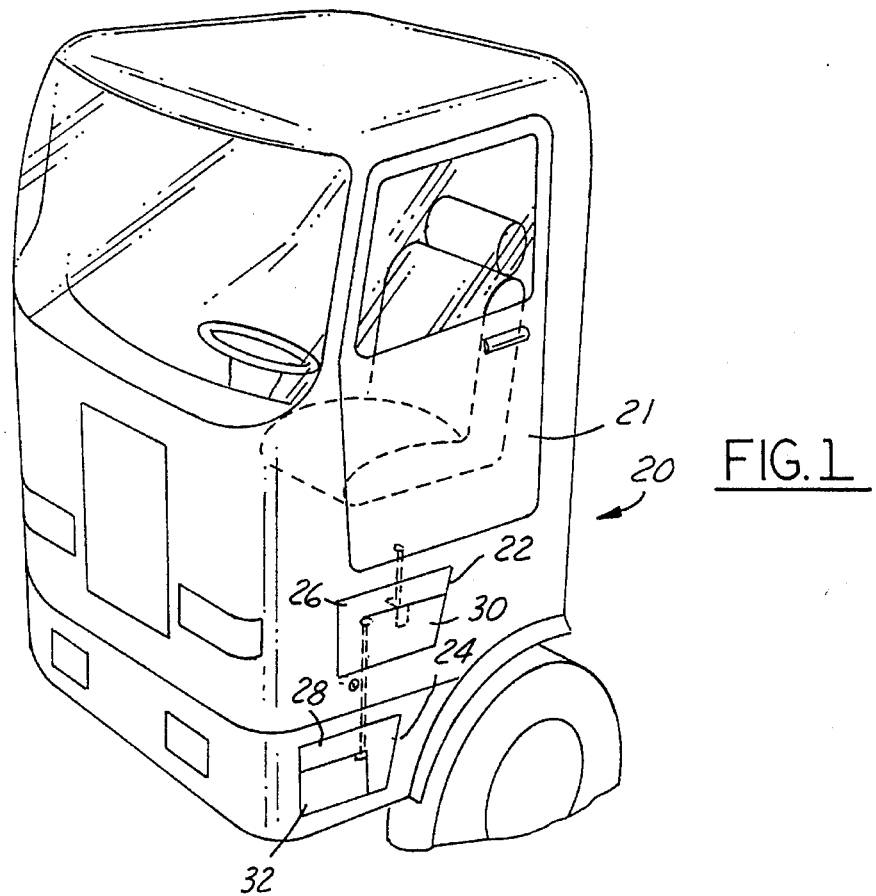
FIG. 1 is an isometric view of a typical cab-over semi-truck cab utilizing a first embodiment of the present invention to restrict access to the built-in cubbyhole steps.

Now referring to FIGS. 1, 2, and 3, a typical cab over semi-truck cab 20 includes "cubby-hole" style steps 22, 24 which serve as a means for allowing the cab driver or cab passenger to gain access to a controlled area of the vehicle (such as the interior portion of the cab). The present invention includes covers 26, 28 and their associated hinged doors 30, 32 which cover cubby-hole steps 22, 24 respectively. Each door 30, 32 has a hinge 34, 36 at the top of the door which allows the bottom of the door to pivot inwardly thereby allowing access to the cubby-hole steps.

Now referring to FIGS. 2, 3, and 4, locking pin 38 resides within hole 39 of floor 41 of vehicle 20 and into hole 40 to secure door 30 in a locked position. Hole 40 is located within bracket 42 which is securely attached to the back of door 30 in such a way that when bracket 42 is held stationary by pin 38, door 30 cannot open. When door 30 is in the locked position, connecting rod 44 is held stationary. Connecting rod 44 connects door 30 to door 32 at pivot 46 and pivot 48 respectively. Connecting rod 44 constrains the motions of door 32 so that it moves in concert with door 30. When door 30 is held closed by locking pin 38, connecting rod 44 holds door 32 closed. When door 32 is pushed open (e.g. by foot 50) connecting rod 44 moves upwardly acting against door 30 to open door 30. With locking pin 38 removed, door 30 and door 32 open freely.

Connecting rod 44 can also be restrained by engaging lock 52. From outside the vehicle, lock 52 can be activated to restrain connecting rod 44. Thus door 30 and 32 are restrained from moving. When lock 52 is disengaged, connecting rod 44 is free to move, thereby allowing doors 30 and 32 to open.

When doors 30, 32 unlocked, a foothold can be gained on step surfaces 31 and 32. Once inside, the driver can drop pin 38 through hole 39 thereby engaging pin 38 in hole 40. With pin 38 in place, door 30 is locked shut which prevents connecting rod 44 from moving (and prevents door 32 from opening). With doors 30 and 32 locked, a person outside the vehicle cannot gain a foothold on the side of the vehicle and therefor cannot gain access to the cab. To exit the vehicle, the driver must remove pin 38 to unlock the mechanism and allow doors 30 and 32 to open. The driver can then climb down by pushing doors 30 and 32 open with a foot to gain access to step surfaces 31, 33. With the mechanism locked, a person without a key is unable to gain a foothold on the truck steps, thus discouraging vandalism.

Figure 5:
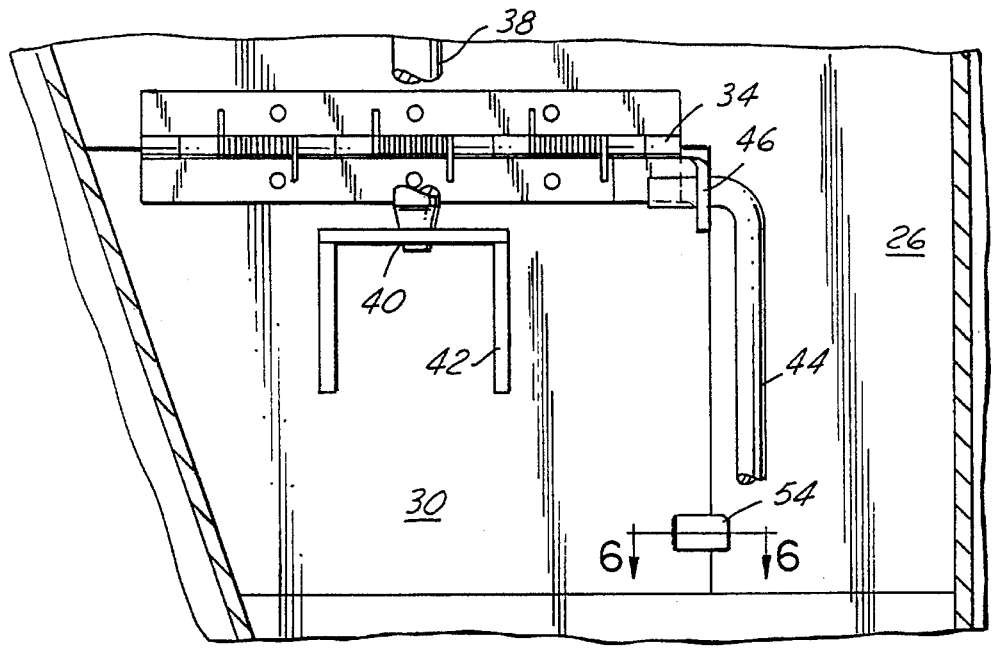
FIG. 5 is a side view taken substantially along lines 5—5 of FIG. 3 showing the hinge and locking pin detail of the present invention.
Figure 6:
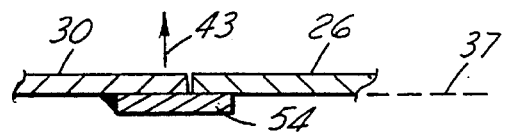
FIG. 6 is a cross-sectional view taken substantially along lines 6—6 of FIG. 5.

Referring to FIGS. 5 and 6, tab 54 restrains door 30 from moving 43 beyond plane 37 of cover 26 (i.e. from being pulled outward 43). Tab 54 is securely attached to door 30 so that door 30 is only able to move inward from cover 26.

Figure 7:
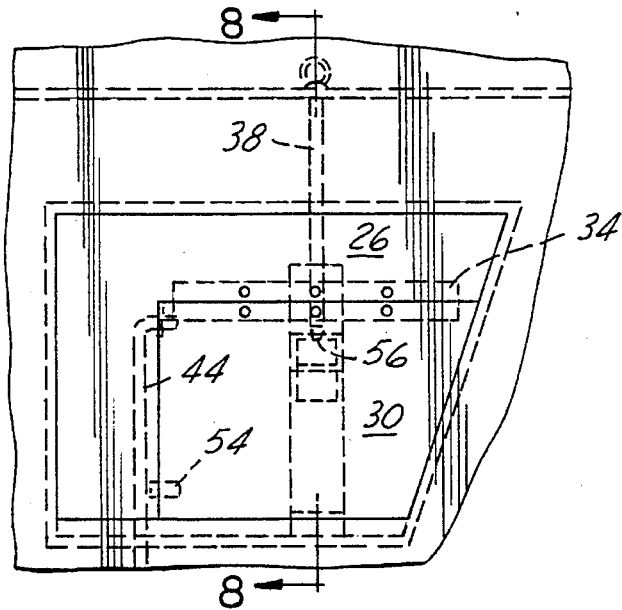
FIG. 7 is a second embodiment of the present invention shown in the locked position.
Figure 8:
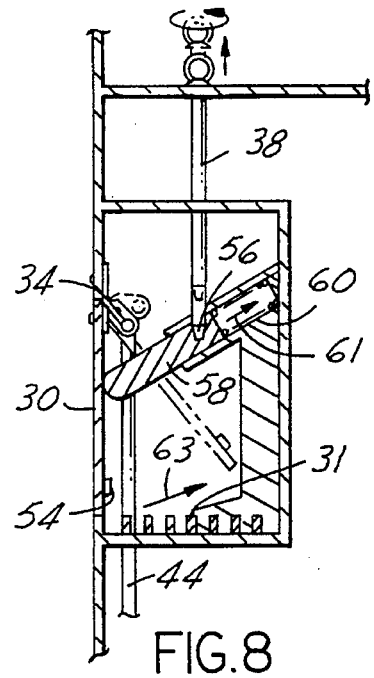
FIG. 8 is a cross-sectional view taken substantially along lines 8—8 of FIG. 7 showing the second embodiment of the present invention in the unlocked and open position.

Referring to FIGS. 7 and 8, a second embodiment of the locking mechanism is shown. In this embodiment, when locking spin 38 is placed in hole 56, it prevents slider 58 from moving 61 rearwardly within slot 60. In turn, slider 58 prevents door 30 from rotating at hinge 34 preventing access to the step. When locking pin 38 is removed, slider 58 can slide freely in slot 60, allowing door 30 to open 63 when pushed.

Figure 9:
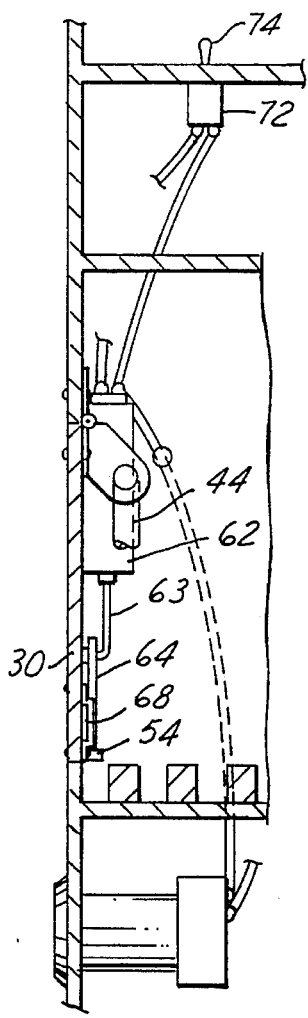
FIG. 9 is a cross-sectional view taken substantially along lines 9—9 of FIG. 10 showing a third embodiment of the present invention.
Figure 10:
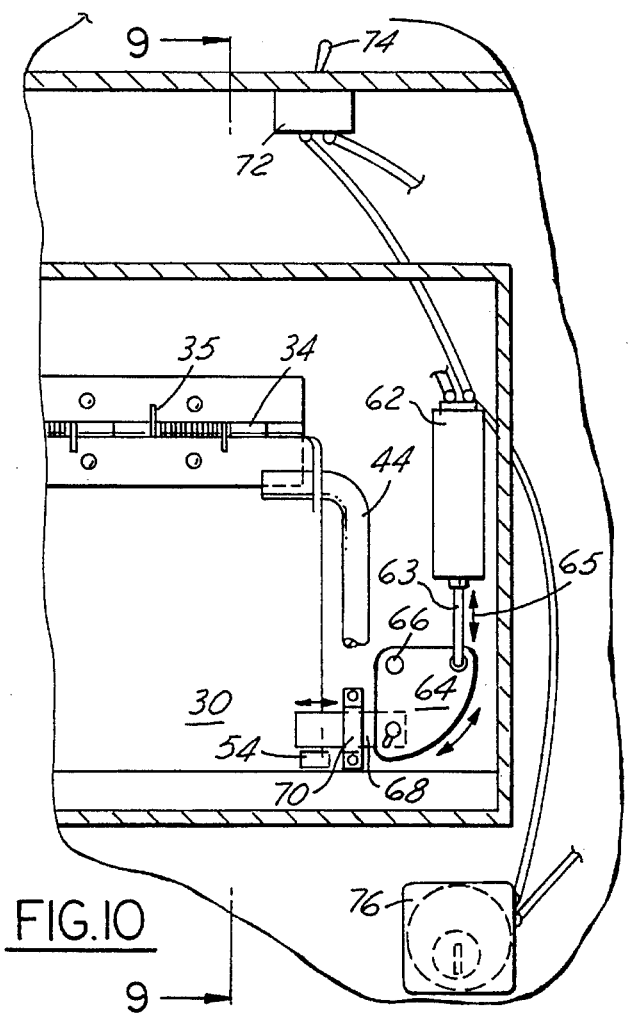
FIG. 10 is a front view of the third embodiments of the present invention.

Now referring to FIGS. 9 and 10, a third embodiment of the present invention is disclosed wherein electric solenoid 62 is capable of moving member 63 in a vertical direction 65, thus operating rocker 64 which rotates about pivot 66. Rotation of rocker 64 causes slider 68 to move through guide 70 and block (and unblock) plate 30. When rocker 64 is in the position shown, slider 68 extends over door 30 preventing it from moving. Spring 35 on hinge 34 urges door 30 into a closed position. Electric solenoid 62 can be operated using electrical switch 72 or key activated electrical switch 76. Switch 72 can be operated using toggle 74 from inside the vehicle. Key switch 76 can be operated from the outside of the vehicle using a key.

Figure 11:
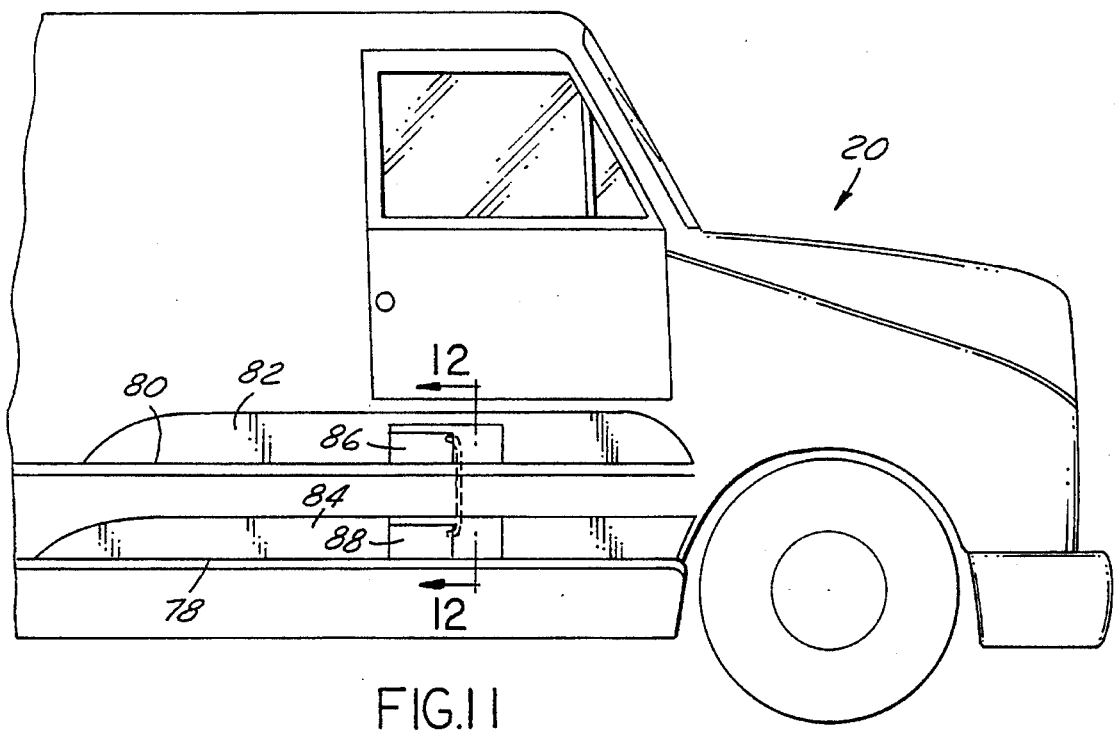
FIG. 11 is a side view of a typical non-cab over semi-cab showing a fourth embodiment of the present invention adapted for use with running boards.
Figure 12:
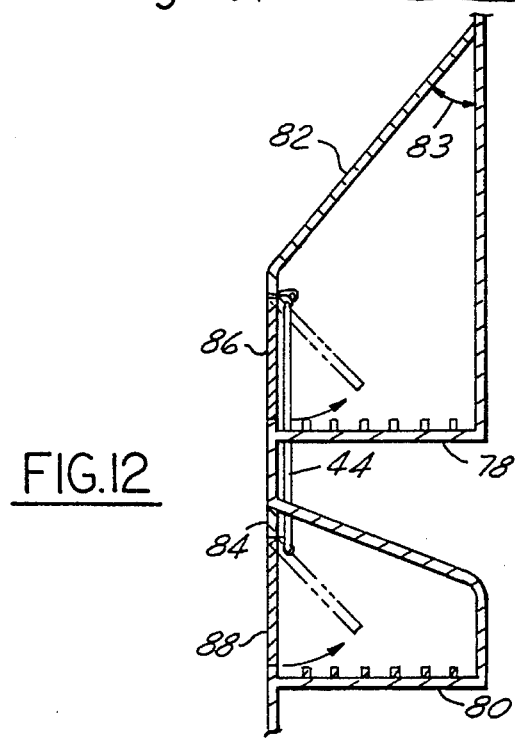
FIG. 12 is a cross-sectional view taken substantially along lines 12—12 of FIG. 11.

Now referring to FIGS. 11 and 12, a fourth embodiment of the present invention is disclosed. This fourth embodiment allows the present invention to be used on a non-cab-over semi-cab application as shown in FIG. 11. In non-cab-over designs, running board steps 78 and 80 run the length of the cab and the steps are not recessed into a cubby-hole. To prevent unauthorized access to this type of step, a cover 82 is attached over the top of the running board 80. Cover 82 has a top surface preferably fashioned at a steep angle 83 to prevent gaining a foothold on top of cover 82. An additional cover 84 is positioned over lower running board 78. Covers 82, 84 include hinged access doors 86, 88 respectively. The extended covers 82, 84 over running boards 78, 80 cover respectively associated cubby-holes formed in covers 82, 84. Doors 86, 88 can be positioned such that they allow easy access to the cab by an authorized user.

Additional sets of doors could be positioned at other locations in covers 82, 84 to allow access to other portions of the cab. Doors 86 and 88 can also be made much wider than that shown to increase access options. Doors 86 and 88 can be locked through any of the embodiments shown using a cubby-hole type design.

From the foregoing, it is appreciated that a novel truck step guard design is provided which not only provides and accomplishes the objectives of the invention, but does so in a particularly effective and reliable manner. It is recognized that those skilled in the art may make various modifications or additions to the preferred embodiments chosen here to illustrate the invention without departing from the spirit and scope of the present invention. Accordingly, it is to be understood that the protection sought to be afforded hereby should be deemed to extend to the subject matter claimed and all fair equivalents thereof.

What is claimed is:

1. A vehicle step lock-up device for preventing access to steps formed within recessed portions of a vehicle body, comprising:

a step access door pivotally mounted to an opening of the recessed portion, the access door having a bracket secured to an inner surface thereof; and a locking member slidably attached to the vehicle body, the locking member having a user engageable upper end located within the interior of the vehicle and a lower end selectively engageable with the bracket, the locking member being vertically movable between a raised position, in which the lower end of the locking member is disengaged from the bracket for permitting inward pivotal movement of the access door into the recessed portion by a user's foot, and a lowered position in which the lower end of the locking member is in locking engagement with the bracket for preventing inward pivotal movement of the access door thus preventing access to the vehicle step.

2. The vehicle step lock-up device of claim 1, wherein said locking member includes a pin.

3. The vehicle step lock-up device of claim 1, wherein said step access door includes first and second spaced apart doors and a connecting rod extending between said first and second doors.

4. The vehicle step lock-up device of claim 3, further including a lock attached between said connecting rod and said vehicle body for preventing relative movement therebetween.

5. The vehicle step lock-up device of claim 1, wherein said step access door includes a tab for limiting the potential movement of said access door in at least one direction.

* * * * *